US011013371B2

(12) United States Patent
Kolar

(10) Patent No.: US 11,013,371 B2
(45) Date of Patent: May 25, 2021

(54) WIRELESS FOOD PROCESSOR DISCS

(71) Applicant: VITA-MIX MANAGEMENT CORPORATION, Olmsted Township, OH (US)

(72) Inventor: David Kolar, Stow, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 402 days.

(21) Appl. No.: 15/917,914

(22) Filed: Mar. 12, 2018

(65) Prior Publication Data

US 2018/0255975 A1    Sep. 13, 2018

Related U.S. Application Data

(60) Provisional application No. 62/469,883, filed on Mar. 10, 2017.

(51) Int. Cl.
*A47J 43/07*    (2006.01)
*B02C 25/00*    (2006.01)
(Continued)

(52) U.S. Cl.
CPC ....... *A47J 43/0761* (2013.01); *A47J 43/0722* (2013.01); *A47J 43/0777* (2013.01); *A47J 43/0783* (2013.01); *B02C 18/083* (2013.01); *B02C 25/00* (2013.01); *H04B 5/0031* (2013.01); *H04B 5/0062* (2013.01); *H04B 5/0068* (2013.01); *H04B 5/02* (2013.01)

(58) Field of Classification Search
CPC ................ A47J 43/0761; A47J 43/0722; A47J 43/0777; A47J 43/0783; A47J 43/07; A47J 43/0711; A47J 43/075; A47J 43/0755; A47J 43/0766; A47J 43/0772; B02C 18/083; B02C 18/143; B02C 18/146; B02C 18/16; B02C 18/182
USPC ............ 241/30, 92, 277, 278.1, 282.1, 37.5; 366/205–206
See application file for complete search history.

(56) References Cited

U.S. PATENT DOCUMENTS 2,372,862 A    4/1945  Strauss et al.
D227,535 S    7/1973  Grimes
(Continued)

FOREIGN PATENT DOCUMENTS

EP    0963726    12/1999
FR    2090007    1/1972
(Continued)

OTHER PUBLICATIONS

Young, Lee W., International Search Report and Written Opinion of the International Searching Authority, dated Aug. 1, 2012 regarding PCT/US12/38591.
(Continued)

*Primary Examiner* — Teresa M Ekiert
*Assistant Examiner* — Jared O Brown
(74) *Attorney, Agent, or Firm* — McDonald Hopkins LLC

(57) ABSTRACT

A blending system that includes a base that is selectively and operatively engaged with a container is shown and described herein. The base may include a near field communications chip that may communicate with a near field communications chip of a cutting disc. The cutting disc identifies a type of the cutting disc, a position of a chute of a lid or both.

12 Claims, 7 Drawing Sheets

(51) Int. Cl.
*H04B 5/00* (2006.01)
*B02C 18/08* (2006.01)
*H04B 5/02* (2006.01)

(56) References Cited

U.S. PATENT DOCUMENTS

| | | | |
|---|---|---|---|
| 4,561,782 A | 12/1985 | Jacobsen et al. | |
| 4,655,373 A | 4/1987 | Essen | |
| 4,664,530 A | 5/1987 | Kurome et al. | |
| D295,012 S | 4/1988 | Gelber | |
| 4,741,482 A * | 5/1988 | Coggiola | A47J 43/046 |
| | | | 241/282.1 |
| 4,822,175 A | 4/1989 | Barnard et al. | |
| 4,883,144 A | 11/1989 | Haushalter et al. | |
| 4,891,966 A | 1/1990 | Kramer | |
| D305,973 S | 2/1990 | Barnard et al. | |
| D309,077 S | 7/1990 | Pomroy | |
| D309,399 S | 7/1990 | Barnard et al. | |
| D321,647 S | 11/1991 | Oldorf | |
| 5,125,197 A | 6/1992 | Fuchs | |
| D336,590 S | 6/1993 | Barnard | |
| 5,275,307 A | 1/1994 | Freese | |
| D345,488 S | 3/1994 | Barnard et al. | |
| 5,323,973 A | 6/1994 | Ferrara et al. | |
| D366,418 S | 1/1996 | Lown et al. | |
| 5,533,797 A | 7/1996 | Gelber | |
| D374,590 S | 10/1996 | Ahern, Jr. | |
| 5,678,718 A | 10/1997 | Morris et al. | |
| 5,696,358 A | 12/1997 | Pfordresher | |
| 5,803,598 A | 9/1998 | Harry et al. | |
| 5,901,906 A | 5/1999 | Bouldin | |
| D412,809 S | 8/1999 | Toro et al. | |
| 5,957,333 A | 9/1999 | Losenno et al. | |
| 5,957,577 A | 9/1999 | Dickson et al. | |
| 5,959,577 A | 9/1999 | Dickson et al. | |
| 5,962,060 A | 10/1999 | Farrell | |
| 6,019,238 A | 2/2000 | Kindig et al. | |
| 6,059,445 A | 5/2000 | St. John et al. | |
| D427,016 S | 6/2000 | Kindig et al. | |
| D429,956 S | 8/2000 | Bohannon, Jr. et al. | |
| 6,102,246 A | 8/2000 | Goulet et al. | |
| D419,369 S | 10/2000 | Naft et al. | |
| D432,864 S | 10/2000 | Kindig et al. | |
| D435,192 S | 12/2000 | Bohannon, Jr. et al. | |
| D437,731 S | 6/2001 | Thackray | |
| D452,296 S | 12/2001 | Egnell et al. | |
| 6,431,744 B1 | 8/2002 | Ash et al. | |
| 6,497,463 B2 | 12/2002 | Moretti | |
| 6,531,967 B2 | 3/2003 | Djorup | |
| D480,915 S | 10/2003 | Kolar et al. | |
| D481,258 S | 10/2003 | Brady et al. | |
| 6,755,305 B2 | 6/2004 | Nance | |
| D495,925 S | 9/2004 | Ulanski et al. | |
| 6,854,876 B2 | 2/2005 | Dickson | |
| D506,393 S | 6/2005 | Nottingham et al. | |
| 6,969,130 B2 | 11/2005 | Newton et al. | |
| 6,979,117 B2 | 12/2005 | Dickson, Jr. | |
| D514,868 S | 2/2006 | Achenbach et al. | |
| 7,063,456 B2 | 6/2006 | Miller et al. | |
| D526,839 S | 8/2006 | Boozer et al. | |
| D526,845 S | 8/2006 | Katz et al. | |
| D528,363 S | 9/2006 | Ulanski et al. | |
| 7,267,478 B2 | 9/2007 | Miller et al. | |
| D552,916 S | 10/2007 | Bodum | |
| 7,341,209 B1 | 3/2008 | Ko | |
| 7,350,963 B2 | 4/2008 | Williams et al. | |
| D577,545 S | 9/2008 | Ulanski | |
| D587,526 S | 3/2009 | Barnard et al. | |
| D588,406 S | 3/2009 | Ulanski et al. | |
| D621,656 S | 8/2010 | Ulanski et al. | |
| D662,359 S | 6/2012 | Boozer et al. | |
| D678,727 S | 3/2013 | Kolar et al. | |
| 8,529,120 B2 | 9/2013 | Ulanski et al. | |
| 8,555,922 B2 | 10/2013 | Migliore et al. | |
| 8,814,011 B2 | 8/2014 | Ulanski et al. | |
| 2003/0042805 A1 | 3/2003 | Bates et al. | |
| 2003/0205148 A1 | 11/2003 | Rubin et al. | |
| 2003/0205635 A1 * | 11/2003 | Lazzer | B26D 7/24 |
| | | | 241/37.5 |
| 2005/0145717 A1 | 7/2005 | Katz et al. | |
| 2005/0152215 A1 | 7/2005 | Stuart et al. | |
| 2005/0178863 A1 * | 8/2005 | Carnevale | A47J 43/0772 |
| | | | 241/36 |
| 2007/0286016 A1 | 12/2007 | Sun | |
| 2008/0135654 A1 * | 6/2008 | Pryor | A47J 43/0716 |
| | | | 241/37.5 |
| 2008/0156913 A1 * | 7/2008 | Orent | A47J 43/06 |
| | | | 241/37.5 |
| 2009/0095322 A1 | 4/2009 | Wakao et al. | |
| 2010/0212076 A1 | 8/2010 | Kihs | |
| 2010/0229894 A1 | 9/2010 | Nagatani et al. | |
| 2010/0308142 A1 * | 12/2010 | Krasznai | A47J 43/0772 |
| | | | 241/36 |
| 2011/0210195 A1 * | 9/2011 | Garcia | A47J 27/004 |
| | | | 241/37.5 |
| 2013/0134245 A1 * | 5/2013 | Gushwa | A47J 43/0716 |
| | | | 241/36 |
| 2013/0134246 A1 * | 5/2013 | Gushwa | A47J 43/0716 |
| | | | 241/36 |
| 2013/0233954 A1 * | 9/2013 | Beber | A47J 43/255 |
| | | | 241/101.2 |
| 2015/0265983 A1 | 9/2015 | Fleming et al. | |
| 2016/0101533 A1 * | 4/2016 | Aramburo | A47J 43/04 |
| | | | 241/101.4 |
| 2017/0119189 A1 * | 5/2017 | Kim | A47J 19/06 |
| 2017/0215646 A1 * | 8/2017 | Zakowski | A47J 43/0716 |

FOREIGN PATENT DOCUMENTS

| | | | | |
|---|---|---|---|---|
| GB | 699947 | 11/1953 | | |
| WO | 3801199 | 2/1988 | | |
| WO | 2009000042 | 12/2008 | | |
| WO | 2011008234 | 1/2011 | | |
| WO | WO-2018007833 A1 * | 1/2018 | | A47J 43/255 |
| WO | WO-2018104743 A2 * | 6/2018 | | A47J 43/07 |

OTHER PUBLICATIONS

Trimarchi, Roberto., Supplementary ESR, PCT/US2012/038591, Oct. 6, 2014, EPO, Munich, Germany.

PCT ISR and Written Opinion of International Application No. PCT/US2011/000949 (dated Sep. 20, 2011—10 pages).

International Preliminary Report on Patentability (International Application No. PCT/US2010/001565) (7 pages—dated Jan. 17, 2012).

Written Opinion (International Application No. PCT/US2011/000361—International Filing Date Feb. 28, 2011) (11 pages—dated Dec. 20, 2011).

ISR of PCT/US2011/000311 (dated May 23, 2011—2 pages).

* cited by examiner

WIRELESS FOOD PROCESSOR DISCS

CROSS-REFERENCE TO RELATED APPLICATION

This application claims priority to U.S. Provisional Patent Application No. 62/469,883 entitled "WIRELESS FOOD PROCESSOR DISCS," filed on Mar. 10, 2017, which is incorporated herein by reference in its entirety.

TECHNICAL FIELD

The present teachings relate to a blending system and method, and more particularly, to a blending system that detects a type of food processing disc.

BACKGROUND

Blending systems are often used to blend and process foodstuffs. Conventional blenders generally include a base with a motor and a mixing container with an operable mixing blade disposed therein. A blender lid is adapted to cover the mixing container. A user inserts contents within the mixing container to be mixed by the rotation of the blade. The container is positioned on the base as a user controls the operation of the motor within the base to rotate the mixing blade within the container to mix the contents therein.

It may be desirable to generally prevent the mixing blades from rotating when the blender lid is completely removed from the container. Interlock systems may be utilized to attempt to prevent the mixing blades from rotating when the blender lid is not positioned on the container. These interlock systems generally prevent the operation of the rotation of the mixing blade unless the blender lid is covering the mixing container.

Typically, known food-processing systems allow for use of different types of cutting discs. These systems use the same speed and torque regardless of which disc is attached to the food processing system. In some systems, different types of food processing discs cannot be attached to certain drive shafts. A need exists for improved blending systems.

SUMMARY

Described is a blending system comprising a base comprising a motor and a first wireless communication device, a container comprising a shaft extending into a cavity from a bottom, a lid operatively coupled to the container, and a cutting disc operatively disposed proximal the shaft, the cutting disc comprising a second wireless communication device operatively in communication with the base. The first wireless communication device and the second wireless communication device may comprise near field communication devices. In another aspect, the first wireless communication device may transmit a signal that operatively induces a response by the second wireless communication device when the container and cutting disc are operatively assembled with the base. It is noted that the container may comprise a food processing container and the base may be operatively attachable with at least one other type of container. The second wireless communication device may comprise a memory device storing parameters associated with the cutting disc. The second wireless communication device may comprise a loop antenna operatively disposed about an axis of the cutting disc. The lid may comprise a chute. The chute may be movable between at least two positions relative to the lid. The lid may operatively detect a position of the chute. The lid comprises at least one magnet that operatively interacts with a magnet of the chute. The at least one magnet of the lid comprises a reed switch operatively coupled to the second wireless device.

Further described is a cutting disc for a food processor comprising a body comprising a first cutting portion and a wireless device disposed on or within the body. The wireless device may comprise a near field communications device. The near field communications device may include a loop antenna disposed about an axis of the body. The cutting device may further comprise a reed switch operatively in communication with the wireless device. The body may comprise a second cutting portion.

Also disclosed herein is a method of processing foodstuff. The method may comprise providing a base comprising a motor and a wireless device, providing a container operatively assembled with the base and a cutting disc, inducing a response by a transmitter of the cutting disc, and identifying, by the wireless device, a parameter associated with the cutting disc based on the response. The parameter may comprise at least one of a proximity of the cutting disc to the base, a history of use associated with the cutting disc, a type associated with the cutting disc, or a blending program associated with the cutting disc. The method may further comprise providing a lid comprising a chute and operatively attachable to the container, and identifying a position of the chute.

DESCRIPTION OF THE DRAWINGS

The present teachings may be better understood by reference to the following detailed description taken in connection with the following illustrations, wherein.

DETAILED DESCRIPTION

Figure 1:
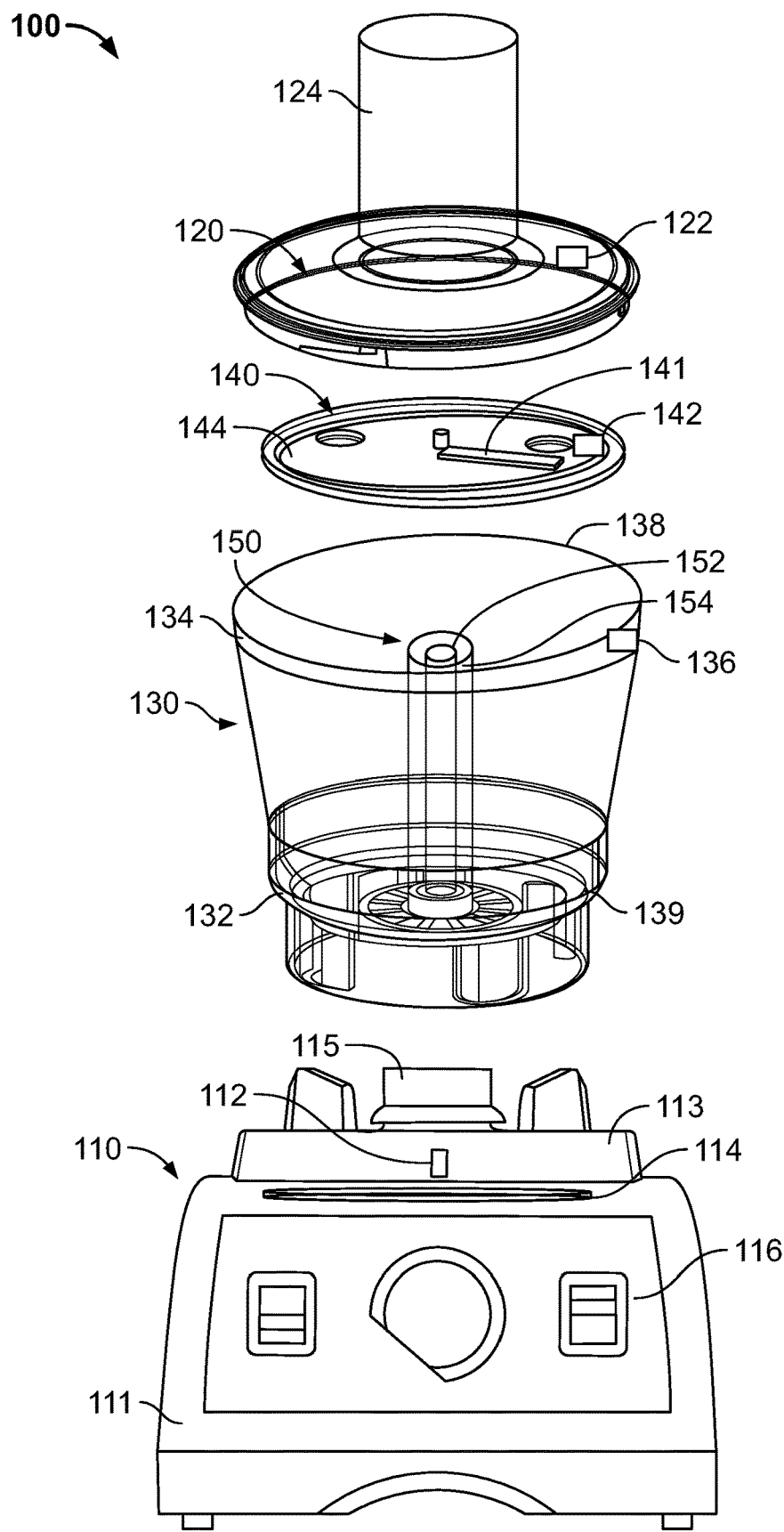
FIG. 1 is an exploded view of a blending system including a cutting disc comprising an NFC component in accordance with various disclosed aspects.

Reference will now be made in detail to embodiments of the present teachings, examples of which are illustrated in the accompanying drawings. It is to be understood that other embodiments may be utilized and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

It is noted that references to a blender, blending system, and the like, are understood to include food processor systems, and other mixing systems. Such systems generally include a blender base that may include a motor, a blade assembly, and a controller. Further, such systems may include a container, a display, a memory and/or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Moreover, blending of ingredients may result in a blended product. Such blended products may include drinks, frozen drinks, smoothies, shakes, soups, purees, sorbets, butter (nut), dips or the like. Accordingly, such terms may be used interchangeably unless context suggests otherwise or warrants a particular distinction among such terms. Further, such terms are not intended to limit possible blended products and should be viewed as examples of possible blended products.

In embodiments, the blending systems may include any household blender and/or any type of commercial blending system, including those with covers that may encapsulate or partially encapsulate the blender. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggests otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

The terms "identification tag," "chip," "NFC component," and the like may be used interchangeably, unless context suggests otherwise or warrants a particular distinction among such terms. Such may refer to an NFC component or tag, which may be capable of sending/receiving a signal. It is noted that embodiments may utilize other radio frequency identification (RFID) devices, transponders, or tags. Accordingly, embodiments reference NFC for brevity, but such embodiments may utilize other RFID devices, methods, or systems. It is further noted that RFID tags may be chosen based on a frequency (e.g., low frequency RFID tags for close communication). Identification tags may comprise printable RFID tags, NFC tags, tags including microchips, or the like. Identification tags can contain stored information, such as in a memory (e.g., read-only memory (ROM), random access memory (RAM), electrically erasable programmable read-only memory (EEPROM), or various other types of memory). In another aspect, an identification tag may be powered by electromagnetic induction from magnetic fields produced by a reader. For instance, an identification tag may include an NFC component that uses induction between two loop antennae located within the container's near field, effectively forming an air-core transformer. The antennae may comprise various materials, such as copper. While an air-core transformer is described, various other antennae formations may be utilized.

In an example, an NFC component may include an NFC tag and an NFC emitter. The NFC tag and NFC emitter may each include one or more antennae. For instance, the NFC tag may include a loop antenna and the NFC emitter may include another loop antenna. It is noted that the loop antennae may or may not be substantially similar to each other. The NFC tag antenna and NFC emitter antenna may be operatively coupled via an electromagnetic field. The coupling may form or represent an air-core coil or transformer. The NFC emitter may generate an alternating current that may be received by the NFC emitter antenna. The current may induce an electromagnetic field through the air or another carrier medium. The electromagnetic field may induce a current in the NFC tag antenna. The received current may provide power to various components of the NFC tag.

In various embodiments, an NFC tag may include the antenna (e.g., inlay), a processor, and a memory device. The memory device may include various types of memory, such as electrically erasable programmable read-only memory (EEPROM) and the like. When the NFC tag is powered (e.g., current induced by the electromagnetic field), the NFC tag may generate a response that may be received by the NFC emitter.

As described herein, the identification tag may be a passive transponder that collects energy from interrogating radio waves and/or may include a local power source such as a battery. As such, an identification tag and a reader may be configured as a passive reader active tag (PRAT) system, active reader passive tag (ARPT) system, an active reader active tag (ARAT) system, or the like.

In another aspect, an identification tag may power various components or devices. For example, an NFC component may power a digital display and/or interface of a container. In embodiments, the identification tag may be configured to operate and/or communicate with a reader when within a threshold distance. For instance, an identification tag may communicate with a reader when the identification tag is less than or equal to j units from the reader, where j is a number and the unit is a unit of distance. In an example, the identification tag may operate when it is less than or about six centimeters from the reader, when it is less than or about one meter from the reader, etc.

Some traditional food processing systems include a container that interlocks with a base, a shaft disposed in the container that operatively couples to a rotor of a motor, and discs that may be connected to the shaft. In certain systems, the discs may be designed such that they interlock with specific shafts or in specific positions. This may prevent incidental attachment of improper discs (e.g., via a mechanical poka-yoke configuration). For example, a disc may have a specifically sized and shaped aperture that receives a specifically sized and shaped shaft.

Discs for food processing may be configured for different types of cutting. For instance, discs may be designed for slicing, grating, spiralizing, ricing, or the like. Further, the discs may come in different cutting-sizes so that users can chose a granularity for grating, thickness for slicing or spiralizing, or the like. Moreover, the position of cutting portions of the discs may be displaced at different positions for the different cutting techniques. It may be desirable to spin the discs at different speeds for the different types of cutting.

A blending system with interlocking capabilities and detection of a presence of or a type of processing disc is described herein. Described embodiments generally include a blender base (housing a motor), a near field communication (NFC) component(s), a food-processing container, a food-processing disc, and a lid. In an aspect, the blending system can determine whether the blender base, container, and lid are "interlocked" (e.g., they are in an operative position whereby a user is prevented from contacting the blades). The NFC components may be disposed in at least one of the blender base, container, or lid.

Aspects of systems, apparatuses or processes described herein generally relate to blending or food-processing systems include a food-processing disc comprising one or more inductive coils. In another aspect, one or more of the disc and/or lid may comprise an NFC component that may interact with an NFC component of a blender base. The NFC component of the blender base may receive information regarding the type of the disc and may utilize the blender base may utilize the information to determine a blending process to be utilized by the system.

In at least some embodiments, a lid may include a chute for receiving foodstuff. The chute(s) may be selectively positioned based on the type of disc utilized. The blender base may utilize an NFC component to identify the position of the chute(s). The blender base may communicate to a user (e.g., via an interface) a correct position of the chute(s). In another aspect, the blender base may prevent operation of the motor until the user correctly positions the chute(s).

Turning to FIG. 1, shown is a front view of a blending system 100 that may comprise a disc identification system in accordance with various disclosed aspects. The blending system 100 may include a blender base 110, a lid 120, a container 130, and a cutting disc or disc 140. The blender base 110 may comprise a housing 111 that houses a motor. The housing 111 may comprise other operative components such as a memory and one or more processor. The memory may store computer executable instructions to be executed by the processor. The processor may comprise a motor control or the like. In another aspect, the housing 111 may include an NFC component 112 that may be communicatively coupled to the memory or processor. The NFC component 112 may operatively communicate with an NFC component 142 of the disc 140 as described herein. It is noted that NFC components 112/142 may comprise transceivers, receivers, memory devices, a processor or the like. It is further noted that various other portions of the blending system 100 may comprise one or more NFC components and the NFC components 112/142 may be positioned on any portion of the housing 111 and disc 140, as applicable.

In at least one embodiment, the NFC component 112 may be disposed at various locations of the blender base 110, such as a pedestal 113, within the housing 111, proximal a coupler 115, in the container 130, or the like. It is noted that that NFC component 112 may be disposed in a position that may allow for communication with the NFC component 142 when the container 130, disc 140 or other components are operatively assembled. It is further noted that NFC components 112 and 142 may comprise antennae that may span a distance to allow for multiple interlocked positions. For example, NFC component 112 may comprise a loop antenna or coil 114 that generally circumvents the axis of the coupler 115, and NFC component 142 may comprise a loop antenna or coil 144 that generally circumvents the axis of the disc 140.

The container 130 may be operatively attached to the blender base 110. The coupler 115 drives one or more of shafts or spindles 152/154. In an example, shaft 154 may be stationary, while shaft 152 may be rotatable. The shaft 152 operatively attaches to the disc 140 as described in more detail herein. The motor may drive the shaft 152 to cause the disc 140 to rotate. As the coil 144 is generally disposed about the axis 140, the coil 144 may rotate. In aspects, the coil 144 and the coil 114 may be generally coaxial such that they may continue to communicate while the coil 144 rotates. It is noted that the coils 144 and 114 may comprise similar diameters or may comprise differently sized diameters.

Figure 8:
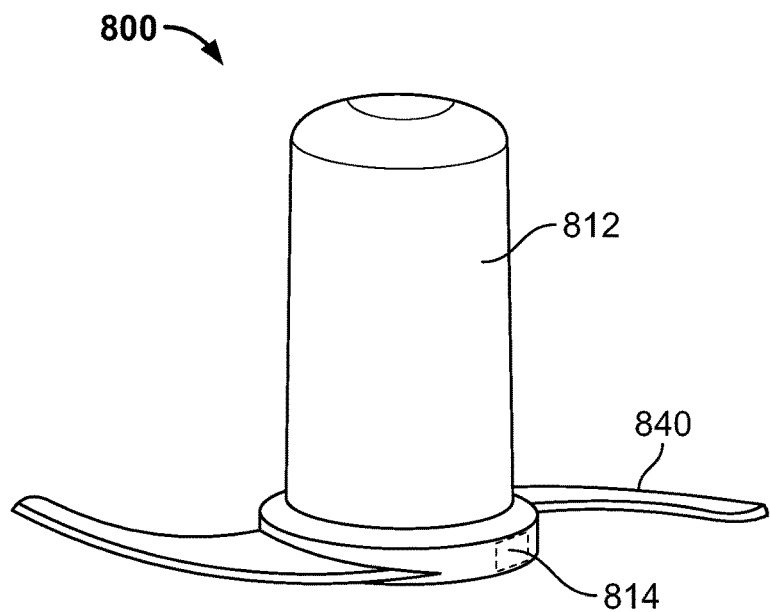
FIG. 8 is a chopping blade operatively usable with the blending system of FIG. 1 in accordance with various disclosed aspects.

While system 100 is generally described as including disc 140 for processing foodstuff, it is noted that the system 100 may include other cutting or blade assemblies. For example, the system 100 may be operatively attachable with a chopping blade 800 as shown in FIG. 8. The chopping blade 800 may include a cylindrical body 812 and one or more radially extending blades 840. In an aspect, the body 812 may include an NFC component 814 comprising an antenna or coil (not shown). The NFC component 814 may be attached, integrated onto or into, secured, or the like to any portion of the chopping blade 800 and is not limited to the location shown. It is noted that the base 110 may receive or otherwise identify information associated with the chopping blade 800.

Moreover, aspects described with reference to the disc 140 may be applicable to the chopping blade 800 unless context suggests otherwise.

The coil 114 may receive information from coil 144 when the disc 140, container 130 and base are operatively assembled. The base 110 (e.g., via a processor and NFC component 112) may identify or detect the presence of the disc 140 based on the received information. In another aspect, the base 110 may utilize the information to identify or otherwise determine a type associated with the disc 140, operating programs available for the disc 140 (e.g., cutting, blending, slicing, grading, or other programs), performance history of the disc 140 (e.g., run time, number of uses, etc.), or the like. It is noted that the NFC component 142 may include a memory that may store information such as a type, programs, performance history or the like. In at least one embodiment, the information may be updated upon occurrence of an event. For example, the blender base 110 may read or write information to the memory of the NFC component 142.

As described herein, the base 110 may receive a pattern from the NFC component 142 for operation of the motor based on a type or other parameters associated with the disc 140. In another aspect, the base 110 may select, based on the type of disc 140, a pattern stored in memory or otherwise received from another device. The type may identify a cutting type of the disc, a size of the cutting type, or the like. For instance, the type may identify whether the disc is a spiralizer disc, slicing disc, grating disc or other type of disc or blade. In another aspect, the type may identify a location of cutting portions, size of cutting portions, or other information. As an example, a spiralizer disc may comprise cutting portions near a center of the disc 140. The disc 140 may rotate and foodstuff may be cut around the center of the disc 140. A slicing disc may comprise slicing portions off center of the disc 140.

Moreover, the different types of discs may be associated with different speeds, torques, or rotational patterns that may be selected or altered by the blender base 110. As an example, the blender base 110 may select a low or high torque depending on whether the disc 140 is a spiralizer disc, a shredding disc, or a slicing disc.

In some embodiments, a user may identify or the base 110 may determine a type of food to be processed by the disc 140 via a user interface 116, a sensor, or a user device such as a smart phone, wearable, laptop, smart scale, or the like. Likewise, the blending system 100 may detect a type of food based on one or more sensors, such as a camera, electronic nose, or the like. The blender base 100 may receive the type of food and adjust or select a cutting pattern. It is noted that the cutting pattern may be selected on one or more of the type of food or the type of disc 140. As such, it is noted that the blending system 100 may comprise other or additional components. For instance, the blending system 100 may comprise an intelligent blending system that may include cameras, optical scanning devices, optical scanners, spectrometer, multi-wave length scanner, electronic noses, or the like. The blending system 100 may include what is described in PCT Application No. PCT/US2017/059497, the entirety of which is incorporated by reference herein.

Figure 9:
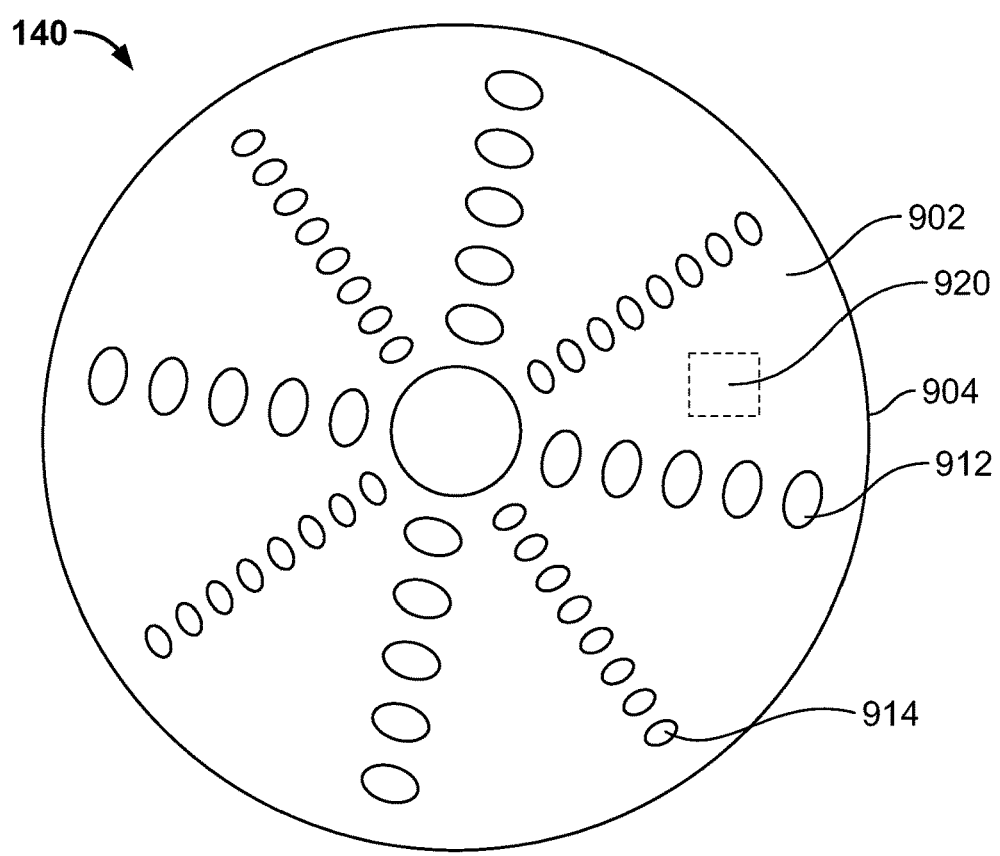
FIG. 9 is a reversible blade operatively usable with the blending system of FIG. 1 in accordance with various disclosed aspects.

In at least one embodiment, the disc 140 may be reversible such that one or more cutting portions 141 may be utilized. For example, FIG. 9 illustrates disc 140 comprising when a first side 902 of the disc 140 is facing upwards towards the lid 120, a first cutting portion 912 may be utilized. When a second side 904 of the disc 140 is facing upwards towards the lid 120, a second cutting portion 914 may be utilized. In an aspect, the first and second cutting portions 912/914 may comprise differently configured cutting portions. For instance, the first cutting portion 912 may comprise a large sized shredding portion and the second cutting portion 914 may comprise a smaller sized shredding portion. The disc 140 may communicate or the base 110 may otherwise determine the orientation of the disc 140. For example, the disc 140 may comprise a motion sensor 920. For instance, an accelerometer may be disposed on or within the disc 140 with a sensitive axis oriented to determine which side of the disc 140 is facing upwards. The motion sensor 920 may be operatively coupled to the NFC component 142. The NFC component 142 may receive information from the motion sensor 920 and may operatively transmit the information to the blender base 110 or other component. It is noted that the base 110 may receive the information regarding orientation while the motor is not operating. This may reduce interference from motion created by the motor. It is noted, however, that the base 110 may utilize noise cancelling algorithms to cancel noise in the motion sensor signal that is induced by motion of the motor. It is further noted that embodiments may utilize other sensors or circuitry to determine an orientation of the disc 140, such as optical sensors, magnetic sensors, or the like.

According to some embodiments, the blending system 100 may additionally or alternatively identify or detect the container 130, lid 120, or chute 124. For instance, container 130 may comprise at least one of a coil 132 and a coil 134. The coil 132 may be disposed generally proximal the base 110 and the coil 134 may be disposed proximal the lid 120. When connected to the base 110, the coil 132 may receive an inductive signal from the coil 114, which may receive power from a power source—the power source may be in any appropriate position, including, by way of a non-limiting example, in the base 110 or container 130. The coil 132 may be connected to coil 134 and a switch 136 (e.g., a reed switch). In an aspect, the coil 132 and coil 134 may be wound in series with each other and with the interposing switch 136, which is also in series. The lid 120 may comprise a magnet 122 and a chute 124. When the lid 120 is operatively connected to the container 130, the magnet 122 may then close the switch 136 so that power may flow from coil 114, to coil 132, and coil 134. When the lid is removed, the switch 136 will close. The base 110 may operatively disable or enable operation of the motor based on whether the switch 136 is open or closed.

In embodiments, the coils 132 and 134 may carry an NFC signal from the NFC component 112 to the NFC component 142 and vice versa when the switch 136 is closed. This may allow the NFC component 112 and NFC component 142 to communicate with one another. For example, the NFC component 142 may transmit a signal to the NFC component 112 through the coils 132/134 that identifies a type associated with the disc 140. It is noted that, in at least one embodiment, the coil 144 may communicate with coil 114 without coils 132 or 134.

Figure 2:
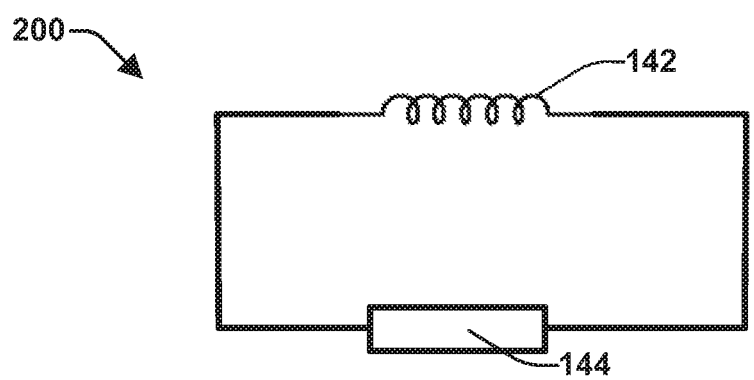
FIG. 2 is a function schematic diagram of a cutting disc of the blending system of FIG. 1 in accordance with various disclosed aspects.
Figure 3:
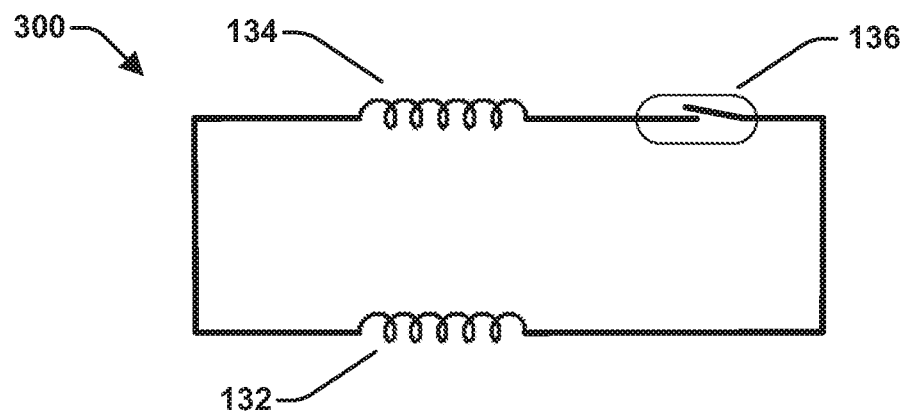
FIG. 3 is a function schematic diagram of a container of the blending system of FIG. 1 in accordance with various disclosed aspects.
Figure 4:
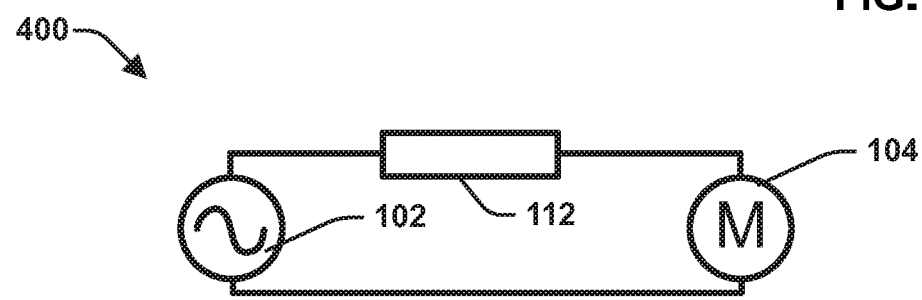
FIG. 4 is a function schematic diagram of a blender base of the blending system of FIG. 1 in accordance with various disclosed aspects.

Turning to FIGS. 2-4, there are depicted schematic diagrams 200, 300, and 400 of the disc 140, container 130, and base 110, respectively. Schematic 400 illustrates the NFC component 112 connected to a power source 102 and a motor 104. In an aspect, the NFC component 112 may include a chip and a loop antenna (e.g., coil 144). Aspects described with reference to FIG. 1 may be viewed through the schematic diagrams 200, 300, and 400.

Referring back to FIG. 1, the blending system may include a drive or output shaft 150. The shaft 150 may be operatively coupled to the motor 104 and the disc 140. The motor 104 may power the shaft 150 so that the shaft rotates the disc 140. This rotation may allow the disc 140 to cut foodstuff inserted through the chute 124.

According to at least one embodiment, the shaft 150 may comprise a dual gear output shaft so that one or more output speeds or torques can be achieved by one output coupling being physically within the geometry of a second output coupling. In an aspect, a gun drilled shaft may allow the output coupling of a first shaft 152 in the center of the second shaft 154 to spin at high speed, while the second or outer shaft 154 (e.g., pipe) may spin at a slower speed. The shafts' speeds may be fed by a gear assembly below the shafts 152/154 on the input side of the shafts 152/154. It is noted that the shafts 152/154 may extend proximal to a top 138 of the container 130, or the disc 140 and may have a center rod (not shown) that would extend down into the container 130 and connect to the dual speed coupling at a bottom 139 of the container 130. The disc 140 may be poke-yoked to the shaft 150 so that certain types of discs connect to the first shaft 152 and other types of discs connect to the second shaft 154.

The shaft 150, in addition or in the alternative, may comprise a single output coupling (e.g., so that that it does not comprise a first and second shaft). The blending system 100 may utilize the NFC components 112/142 to identify the type disc utilized. It is noted that the blending system 100 may identify the type of disc 140 utilized when the shaft 150 comprises a two output shaft 152/154. This may allow the blending system 100 to select cutting speeds, torque or other blending programs based on the type associated with the disc. The NFC component 142 can contain a plurality of information about the disc 140 itself and parameters for operation of the motor 104.

Figure 5:
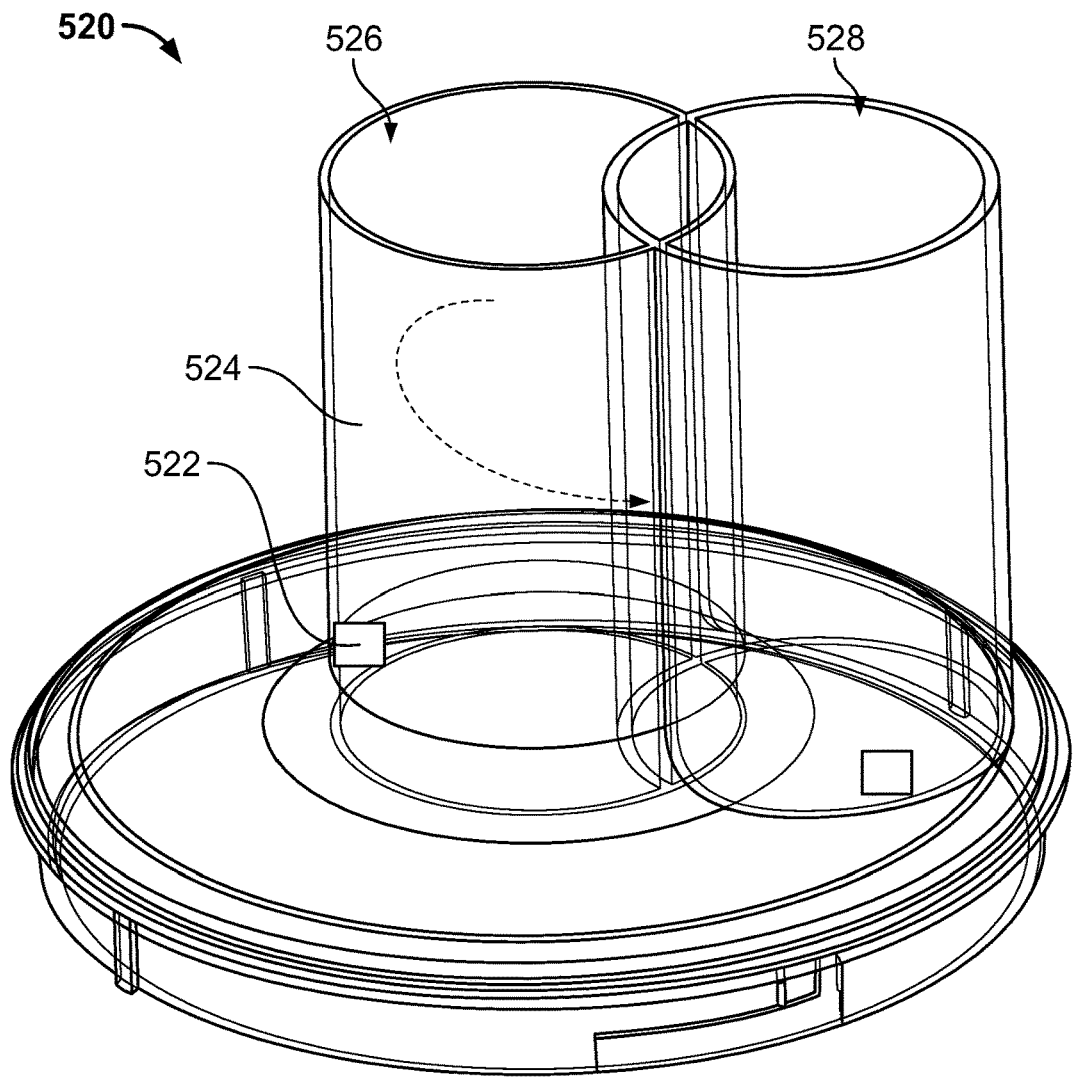
FIG. 5 is a perspective view of a lid of a blending system in accordance with various disclosed aspects.
Figure 6:
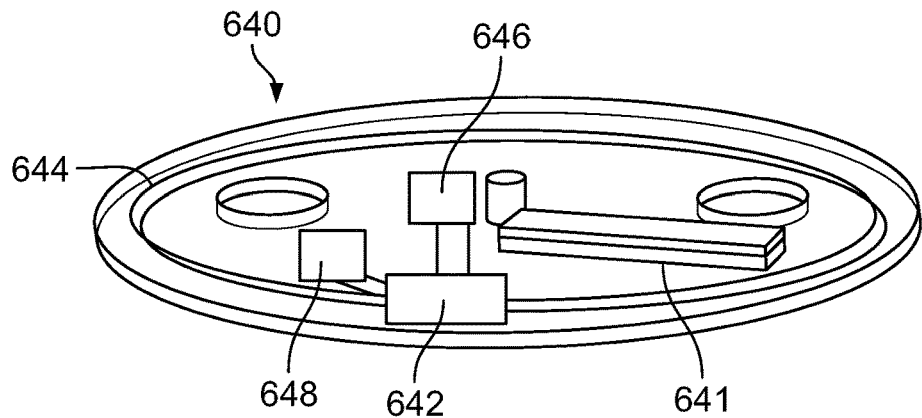
FIG. 6 is a perspective view of a cutting disc of a blending system in accordance with various disclosed aspects.

Turning now to FIGS. 5 and 6, there is a lid 520 and a disc 640 in accordance with various disclosed aspects. It is noted that lid 520 and disc 640 may be utilized by various disclosed embodiments. For instance, lid 520 and disc 640 may be utilized by blending system 100. As such, lid 120 may comprise similar aspects as lid 520 and disc 140 may comprise similar aspects as disc 640.

Lid 522 may comprise a chute 524 and a magnet 526. The chute 524 may allow a user to feed or otherwise dispose foodstuff to the disc 640. The chute 524 may be of any configuration and is not limited to that shown and described. By way of a non-limiting example, the chute 524 may be generally cylindrical, oval in cross-sectional shape, rectangular, square or a combination of the foregoing. The disc 640 may be operatively attached to a shaft of a blending system that rotates the disc 640. The disc 640 may comprise a cutting portion 641 that may slice, spiralizer, shred, grate, or otherwise cut foodstuff as the disc 640 rotates.

In embodiments, the disc 640 may comprise one or more NFC components 642, a loop antenna or coil 644, a first or central switch 646 and a second or off-center switch 648. In an aspect, the central switch 646 may be disposed proximal a general center of the disc 640 and off-center switch 648 may be disposed generally off-center of the disc 640. For example, the central switch 646 may be closer to the center or centroid of the disc 640 than the off-center switch 648 is to the general center or centroid of the disc 640. The switches 646/648 may be disposed such that they selectively experience magnetic forces when the disc 640 and the lid 520 are attached to a blending system as described in more detail herein.

Lid 520 generally comprises the chute 524 and one or more magnets 522. The chute 524 may be positionable in one or more positions, such as a first position 526 and a second position 528. For purpose of illustration, the first position 526 may be generally closer to the center of the lid 520 than the second position 528 is to the center of the lid 520. However, these are merely exemplary positions and other positions are contemplated by this disclosure. The chute 524 may move about a pivot, hinge, slidable, or the like. It is noted that the chute 524 may be lockable in the first position 526 or second position 528 (or any additional position(s)). In another aspect, the chute 524 may allow a user to add food to the path of the cutting portion 641 of the disc 640 as the food passes through the lid 520. It is noted that the chute 524 may include a flange or a stop that prevents a user from inserting objects into a container other than through the chute 524.

Figure 7:
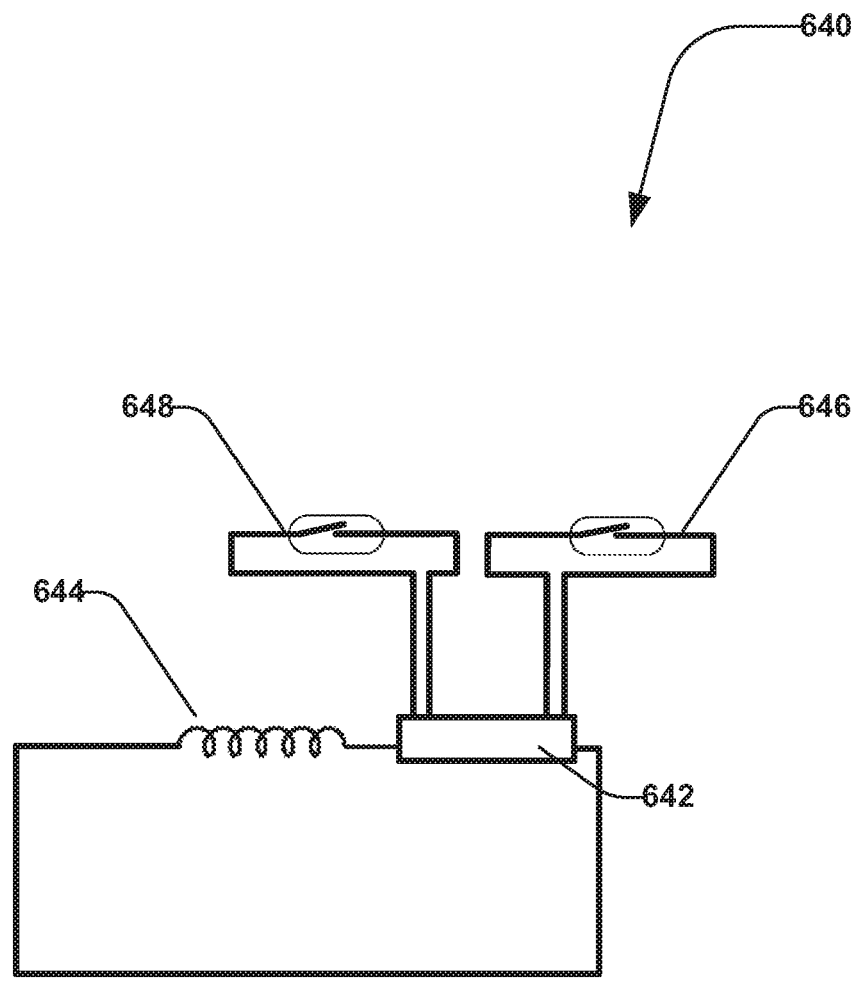
FIG. 7 is a function schematic diagram of the cutting blade of FIG. 6 in accordance with various disclosed aspects.

In the first position 526, the chute 520 may be generally near the center of the lid 520. This position may be suited for a particular type of disc, such as a spiralizer disk. In the second position 528, the chute 520 may be generally off-center and may be positioned for a second type of disc, such as a slicing disk. As shown, the magnet 522 may move in space when the chute 524 changes positions. In the first position 526, the magnet 522 may interact with the central switch 646, and it may interact with the off-center switch 648 when in the second position 528. The NFC component 642 may identify if either switch 646/648 is closed and may communicate this information to a blender base, such as blender base 110. In an aspect, identification of which switch is closed may indicate the position of the chute 524. In at least one embodiment, when the chute 524 is in the first position 526, the disc 640 may not need to be rotated to close the switch 646. When in the second position 528, however, the disc 640 may need to be rotated so that the off-center switch 648 is closed by the magnet 522. A schematic of the disc 640 is provided in FIG. 7.

In accordance with various aspects, the movable chute 524 may allow for a multi purpose disc 640 (e.g., a disc which may perform more than one cutting operation) to be utilized with a selectable blending process. For instance, when the blending system identifies that the chute 524 is in the first position 526, the blending system may select a blending pattern based on spiralizing. When the blending system identifies the chute 524 is in the second position 528, the blending system may select a patter based on a slicing cutting portion. It is noted that the NFC component 642 may transmit information to a blending system to identify a blending program or set parameters for blending based in the NFC component 642 detecting the position of the chute 524.

Further still, in some embodiments power may be transmitted from a coil positioned on or within the container 130 (or any other container) to the NFC component or coil. This may allow for a self-powered container or a container that is able to power the NFC component or any other portion thereof. Further, in these embodiments, a variable pitch blade may be utilized or a blade that can achieve a variable cut depth during operation may be utilized. The variable cut depth by the blade may be mechanically or electronically achieved in any manner. By way of a non-limiting example, the blade may be adjusted electronically from power harvested from the coil in the container. A command may be sent from the blender base, e.g., from the front panel on the blender, or from a wirelessly connected, wired connected or otherwise operatively connected third party device, such as a smartphone, tablet, computer, wearable, laptop and the like. By way of a non-limiting example, a command may be sent (automatically or through operator intervention) from a recipe stored on a computing device such as a tablet. This command may set the applicable depth from a range of depths achievable. This may be accomplished through a low power mode to save power consumption.

Figure 10:
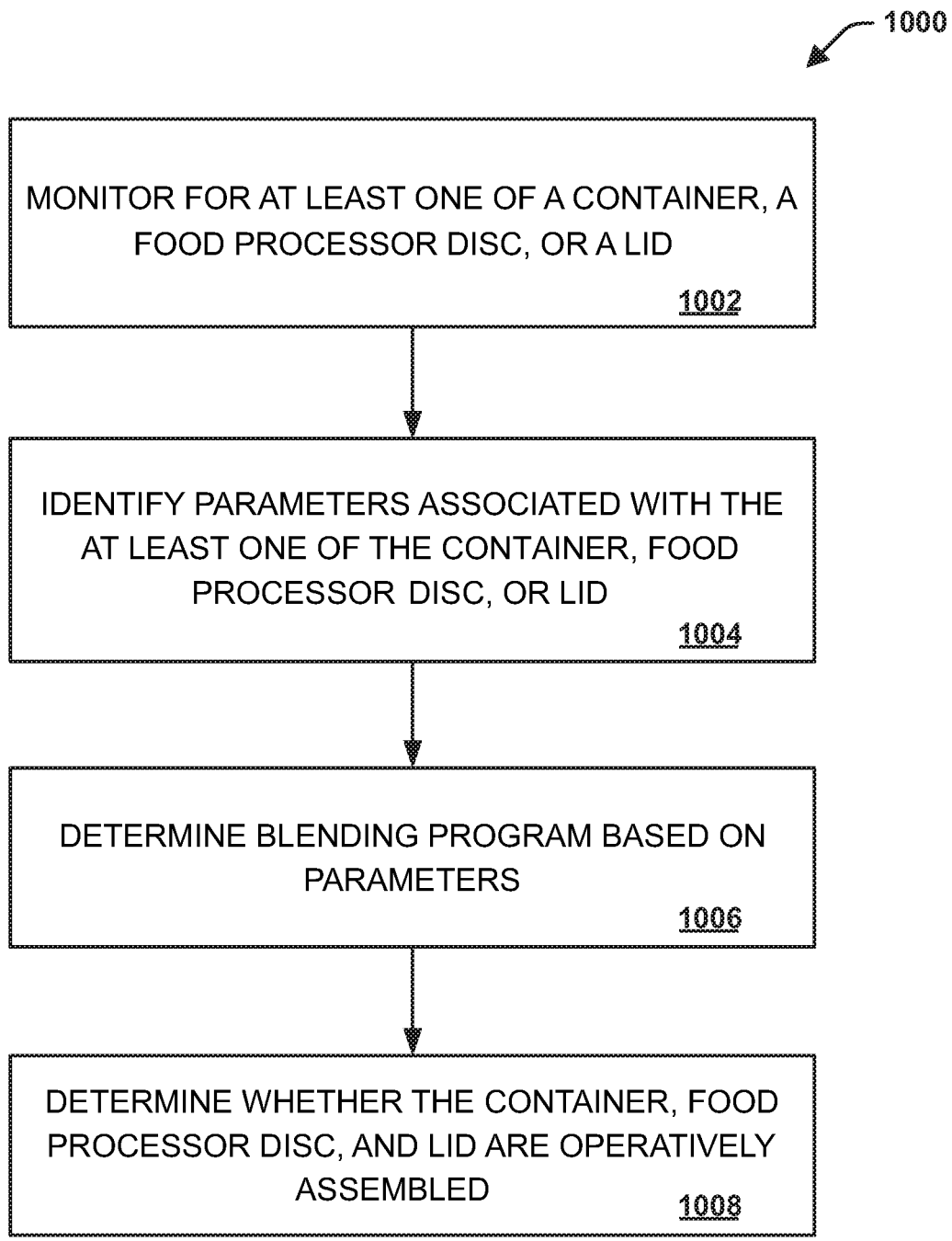
FIG. 10 is a method associated with the blending system of FIG. 1 in accordance with various disclosed aspects.

In view of the subject matter described herein, methods that may be related to various embodiments may be better appreciated with reference to the flowchart of FIG. 10. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 10 depicts an exemplary flowchart of non-limiting method 1000 associated with a blending system, according to various aspects of the subject disclosure. As an example, method 1000 may activate program buttons and convey information associated with the program buttons.

At 1002, a system, such as a blender system, may monitor for at least one of a container, a food processor disc, or a lid. For instance, a blender base may utilize an NFC transceiver to listen or monitor for other NFC devices. Monitoring may include emitting a signal to induce a response from another device. It is noted that monitoring may include processing, decoding, or otherwise receiving a signal from another device. It is further noted that a blender base may continuously, periodically, or manually (e.g., in response to input from a user) monitor other devices.

In an example, the blender base may generate a wireless signal that operatively induces a response in one or more devices, such as a passive NFC device within a container, a lid, a disc, or the like. The blender base operatively receives a signal in response to inducing the passive NFC device when the NFC device is within a predetermined proximity to the blender base. Additionally or alternatively, the blender base may receive a signal from an active NFC device in accordance with various disclosed aspects.

At 1004, the system may identify parameters associated with the at least one of the container, food processor disc, or lid. The parameters may include an identifier (e.g., type, unique identifier, blending program, make/model, etc.), associated blending programs, historical performance data, or the like. Identification may include matching an identifier with an entry stored in a database within the blender or via a networked connect, receiving information, or the like.

At 1006, the system may determine the blending program based on parameters. As described herein, determining the blending program may include receiving a blending program from an NFC device, determining an appropriate blending program stored in memory, or the like.

At 1008, the system may determine whether the container, food processor disc, and lid are operatively assembled. This may include determining whether the container, food processor disc, and lid are attached to the blender base in an operative configuration. In another aspect, this may include determining whether the chute is in an operative position based on at least one of an identified blending program, location of the chute, type of blade, or the like. It is noted that the method 1000 may include providing instructions to a user to correct inoperative positions, preventing or allowing operation of a motor, or the like.

Figure 11:
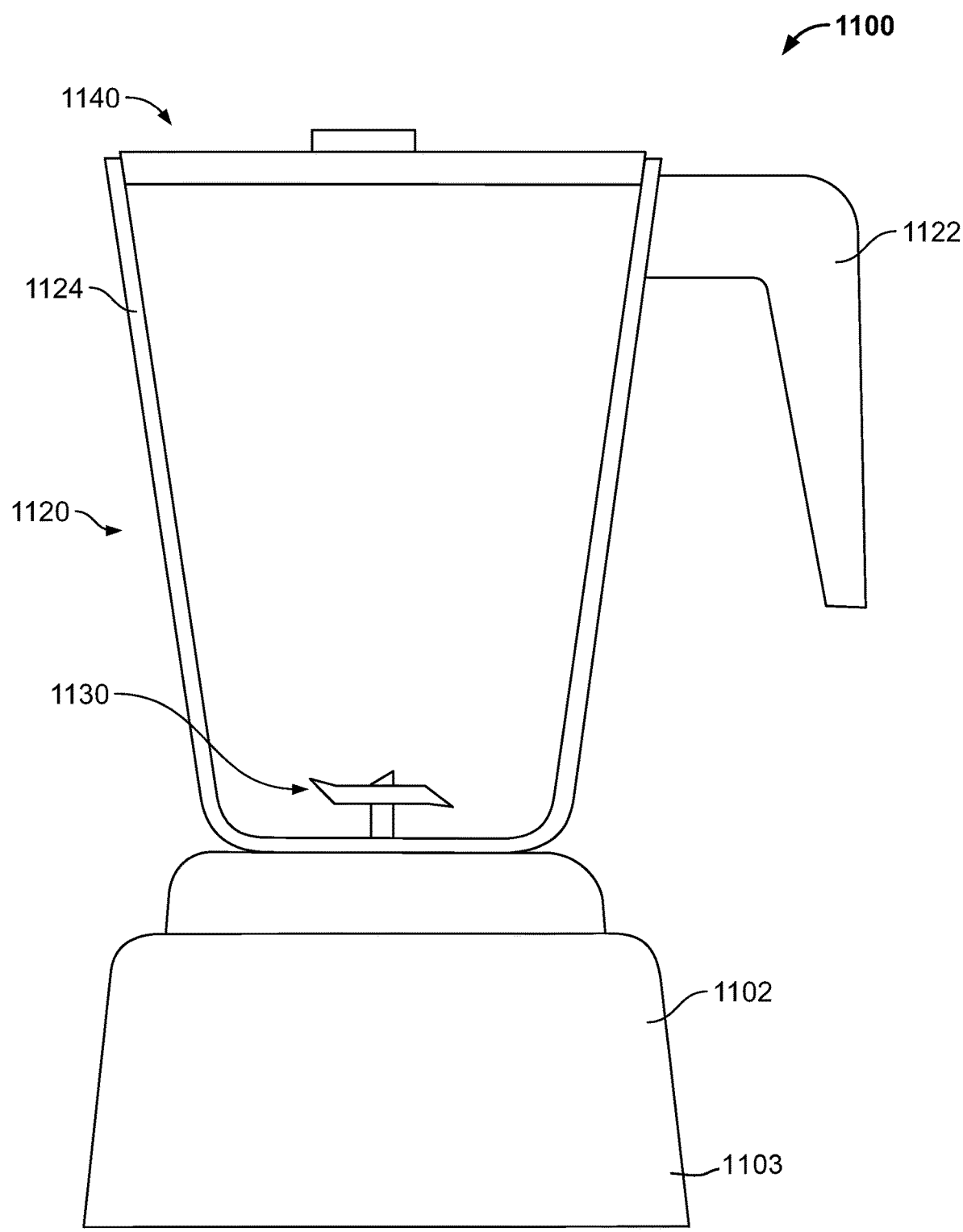
FIG. 11 is a blender device in accordance with various embodiments described herein.

FIG. 11 illustrates an exemplary blending system 1100 in accordance with various disclosed embodiments. System 1100 may utilize various disclosed aspects. For instance, system 1100 may include a large format container, a personal serving sized container, or a food processing container (e.g., container 130) as described herein. It is noted that blending system 1100 may allow for interchangeable containers.

System 1100 primarily includes a blender base 1102, a container 1120 (or 140) operatively attachable to the blender base 1102, a blade assembly 1130, and a lid 1140 that may be operatively attached to the container. The container 1120 may include walls 1124 and a handle 1122. Foodstuff may be added to the container 1120 for blending. It is noted that the container 1120 may comprise various materials such as plastics, glass, metals, or the like. In another aspect, container 1120 may be powered in any appropriate manner.

The blade assembly 1130, container 1120, and base 1102 may removably or irremovably attach. The container 1120 may be powered in any appropriate manner. While shown as a large-format system, system 1100 may comprise a single serving style system, where the container is filled, a blender base is attached to the container, and then the container is inverted and placed on a base.

The base 1102 includes a motor disposed within a housing 1103. The motor selectively drives the blade assembly 1130 (e.g., cutting blades, chopping blades, whipping blades, spiralizing blades, etc.). The blade assembly 1130 may agitate, impart heat, or otherwise interact with contents within the container. Operation of the blender system 1100 may impart heat into the contents within container 1120.

In at least one embodiment, the blending system 1100 may identify or detect whether the system 1100 is interlocked through mechanical detection (e.g., push rods), user input, image recognition, magnetic detection (e.g., reed switches), electronic detection (e.g., inductive coils, a near field communication (NFC) component), or the like.

System 1100 and processes described herein generally relate to blending or food-processing systems and include a food-processing disc comprising one or more inductive coils. In another aspect, one or more of the disc(s) and/or lid may comprise an NFC component that may interact with an NFC component of a blender base. The NFC component of the blender base may receive information regarding the type of the disc and the blender base may utilize the information to determine a blending process to be utilized by the system.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blending system comprising:
a base comprising a motor and a first wireless communication device;
a container comprising a shaft extending into a cavity from a bottom of the container;

a lid operatively coupled to the container, wherein the lid comprises a chute that is selectively positionable between at least two positions; and a cutting disc operatively disposed proximal the shaft, the cutting disc comprising a second wireless communication device operatively in communication with the first wireless communication device wherein the second wireless communication device operatively detects one of the at least two positions of the chute.

2. The blending system of claim 1, wherein the first wireless communication device and the second wireless communication device comprise near field communication devices.

3. The blending system of claim 1, wherein the first wireless communication device transmits a signal that operatively induces a response by the second wireless communication device when the container and the cutting disc are operatively assembled with the base.

4. The blending system of claim 1, wherein the second wireless communication device comprises a memory device storing parameters associated with the cutting disc.

5. The blending system of claim 1, wherein the second wireless communication device comprises a loop antenna operatively disposed about an axis of the cutting disc.

6. The blending system of claim 1, wherein the container comprises a food processing container.

7. The blending system of claim 6, wherein the base is operatively attachable with at least one blender container.

8. The blending system of claim 1, wherein the lid comprises at least one magnet and the chute comprises a chute magnet wherein the at least one magnet operatively interacts with the chute magnet in detecting the position of the chute.

9. The blending system of claim 8, wherein the at least one magnet of the lid comprises a reed switch operatively coupled to the second wireless device.

10. The blending system of claim 8, wherein the second wireless communication device transmits information to the base to identify a blending program or set parameters for blending based on the second wireless communication device detecting the position of the chute.

11. A method comprising:
providing a base comprising a motor and a wireless device;
providing a container operatively assembled with the base and a cutting disc;
inducing a response by a transmitter of the cutting disc;
identifying, by the wireless device, a parameter associated with the cutting disc based on the response;
providing a lid comprising a chute that is selectively positionable between at least two positions; and
identifying, by the transmitter, one of the at least two positions of the chute.

12. The method of claim 11, wherein the parameter comprises at least one of a proximity of the cutting disc to the base, a history of use associated with the cutting disc, a type of container used with the cutting disc, or a blending program associated with the cutting disc.

\* \* \* \* \*